United States Patent [19]

Akimoto et al.

[11] Patent Number: 4,799,072
[45] Date of Patent: Jan. 17, 1989

[54] SEPARATE-EXPOSURE PHOTOGRAPHING APPARATUS

[75] Inventors: Taizo Akimoto; Masahide Akisada; Takatoshi Seiki; Norio Ookawa; Tatsuo Yoshino; Yuji Takamura, all of Kanagawa, Japan

[73] Assignee: Fuji Photo Film Co., Ltd., Kanagawa, Japan

[21] Appl. No.: 147,560

[22] Filed: Jan. 19, 1988

Related U.S. Application Data

[63] Continuation of Ser. No. 883,221, Jul. 8, 1986, abandoned, which is a continuation-in-part of Ser. No. 828,579, Feb. 11, 1986, Pat. No. 4,629,300, which is a continuation of Ser. No. 447,461, Mar. 21, 1983, abandoned.

[30] Foreign Application Priority Data

Mar. 21, 1982 [JP] Japan ................................. 57-45305

[51] Int. Cl.⁴ .......................... G03B 1/00; G03B 29/00
[52] U.S. Cl. ...................................... 354/76; 354/123
[58] Field of Search ................... 354/75, 76, 77, 120, 354/123, 124, 261; 355/53; 271/262

[56] References Cited

U.S. PATENT DOCUMENTS

| 3,281,145 | 10/1966 | Reilly | 271/262 |
| 3,850,522 | 11/1974 | Vane et al. | 354/124 X |
| 3,984,850 | 10/1976 | Bley | 354/125 |
| 4,033,693 | 7/1977 | Payrhammer et al. | 354/261 X |
| 4,103,310 | 7/1978 | Yasillo | 354/76 X |
| 4,206,465 | 6/1980 | Tanoto et al. | 354/123 X |
| 4,285,587 | 8/1981 | Schiff et al. | 354/124 |
| 4,615,596 | 10/1986 | Müller et al. | 354/76 |
| 4,629,300 | 12/1986 | Akimoto | 354/76 |

OTHER PUBLICATIONS

Fuji Medical Imaging Camera, FIM354, 3AH brochure, 1983.

Primary Examiner—Michael L. Gellner
Attorney, Agent, or Firm—Sughrue, Mion, Zinn, Macpeak, and Seas

[57] ABSTRACT

A separate-exposure photographing apparatus including an image display unit for displaying an image to be photographed. A projection optical system projects and focuses the image displayed on the image display unit onto a film. The projection optical system has a reflecting mirror therein, and the image display unit is horizontally movable. A film feeder mechanism feeds the film and is capable of feeding the film in a vertical direction.

19 Claims, 9 Drawing Sheets

SEPARATE-EXPOSURE PHOTOGRAPHING APPARATUS

This is a continuation of Ser. No. 883,221, filed on July 8, 1986, abandoned, which is a continuation-in-part of Ser. No. 828,579, filed on Feb. 11, 1986, U.S. Pat. No. 4,629,300, which is a continuation of Ser. No. 477,461, filed on Mar. 21, 1983 all abandoned.

BACKGROUND OF THE INVENTION

This invention relates to a separate-exposure photographing apparatus for picture images displayed by an image display unit such as a CRT on a single photographic film. The film ordinarily comprises a cut sheet known as a sheet film, but may also be a web of film that will be cut off into a sheet film after exposure.

Contemporary medical diagnosis techniques find increasing use of separate-exposure photographing apparatus for images displayed by a television monitor on a single photographic film. One such separate-exposure photographing apparatus is disclosed in Japanese Laid-Open Patent Publication No. 5560937. This system comprises a television monitor having a display screen facing upwardly, a film feeder disposed above the television monitor for feeding a film along a path parallel to the display screen and a photographic lens interposed between the film feeder and the television monitor. The television monitor is movable parallel to the plane in which the film can be fed. Since the film is horizontally supported, the flatness of the film tends to be impaired by gravity resulting in a poor photographic image. Another disadvantage of this system is that the apparatus takes up a relatively wide area of installation as the film travels in the horizontal plane for successive exposures.

SUMMARY OF THE INVENTION

With the foregoing problems of the prior art, it is an object of the present invention to provide a separate-exposure photographing apparatus which will eliminate the conventional difficulties, that is, can produce photographed images of high quality yet takes up a relatively small area.

It is another object of this invention to define a separate-exposure photographing apparatus that satisifies contemporary medical diagnosis requirements.

These objects are achieved by providing a separate-exposure photographing apparatus including an image display unit for displaying an image to be photographed. A projection optical system projects and focuses the image displayed on the image display unit onto a film and a film feeder mechanism feeds the film. Specifically, in accordance with this invention, the projection optical system has a reflecting mirror therein and the image display unit is horizontally movable. The film feeder mechanism is capable of feeding the film in a vertical direction.

Embodiments of the present invention will hereinafter be described in detail with reference to the drawings.

DESCRIPTION OF THE PREFERRED EMBODIMENTS

Figure 1:
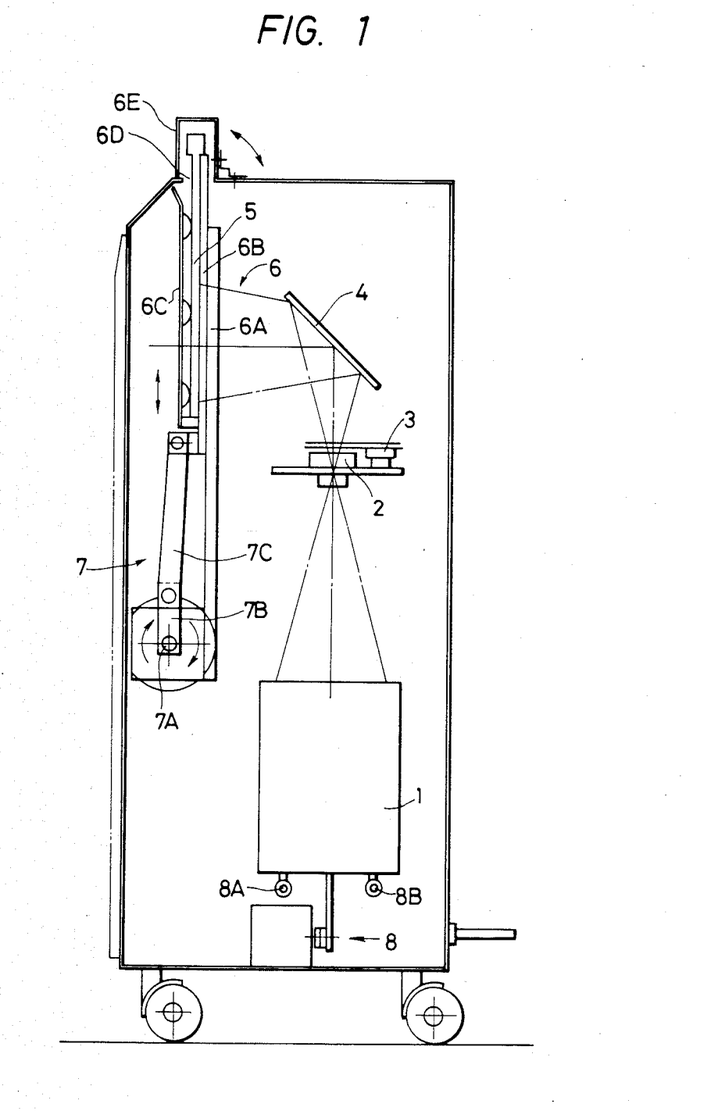
FIG. 1 is a schematic vertical cross-sectional view of an apparatus according to a first embodiment of the present invention.

FIG. 1 shows a separate-exposed photographing apparatus using a film cassette according to a first embodiment of the present invention. The separate-exposure photographing apparatus according to this first embodiment serves to expose four frames on sheet film loaded in a cassette, and comprises a television monitor 1, a photographic lens 2, a photographic shutter 3, a mirror 4, a film cassette 5, a cassette holder 6, a cassette moving mechanism 7, and a television monitor moving mechanism 8.

The television monitor 1 includes a CRT having its display screen facing upwardly and internal electronics for driving the CRT. Such devices are well known. The television monitor 1 is mounted on and movable by the television monitor moving mechanism 8 on and along guide rails 8A, 8B in a direction normal to the plane of the sheet of FIG. 1. As shown in the side elevational view of FIG. 2, the television monitor moving mechanism 8 comprises a crank mechanism composed of a first arm 8D attached to an output shaft 8C of a pulse or stepping induction motor (not shown), and a second arm 8E angularly movably mounted by a pin on the first arm 8D. A position detector mechanism includes a cam 8F mounted on the shaft 8C of the stepping motor and a pair of limit switches 8G, 8H held in engagement with the cam 8F. The limit switches 8G, 8H are positioned with respect to the cam 8F such that the sensor trips will engage the cam detent so that the stepping motor will be de-energized each time the crank mechanism reaches it top dead center or bottom dead center. Thus, as shown, the sensors are 180° apart and sensor 8G is illustrated engaging the cam 8F.

Figure 2:
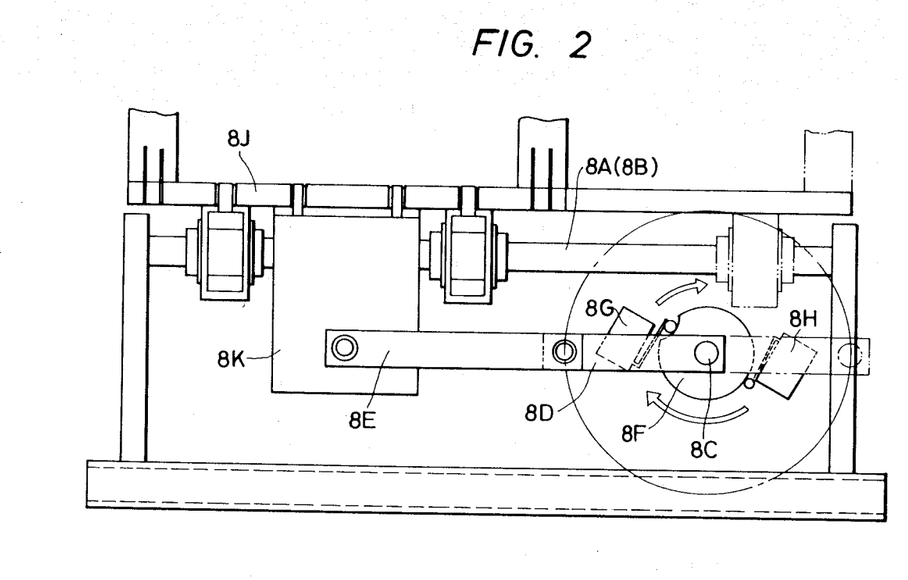
FIG. 2 is a side elevational view of a television monitor moving mechanism.

The second arm 8E of the crank mechanism is also angularly movably mounted by a pin on a bracket 8K fastened to a mount base 8J supporting the television monitor 1 and movable on and along the guide rails 8A, 8B. The television monitor 1 can thus be moved reciprocably between the top and bottom dead centers of the crank mechanism in response to angular movement of the stepper motor.

The photographic lens 2, the photographic shutter 3, and the mirror 4 are constructed integrally with the television monitor 1 so that they can move with the monitor and thus relatively with respect to the cassette 5 while maintaining their relative positional relationship. The photographic lens 2 should preferably comprise a long-focus lens having a focal length on the order of 135 mm to prevent distortions of photographed images.

Figures 3, 4A:
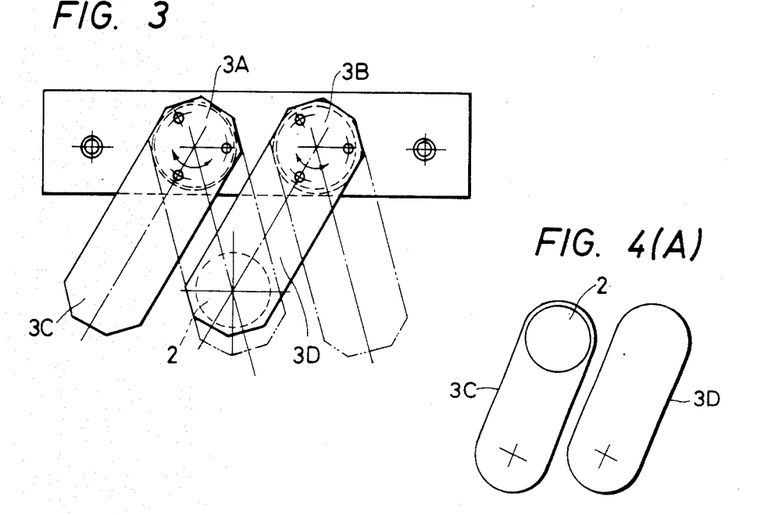
FIG. 3 is an enlarged plan view of a shutter.
FIGS. 4(A) through 4(D) are views from the lens looking upward toward the shutter showing progressive operations of the shutter.
Figure 4B:
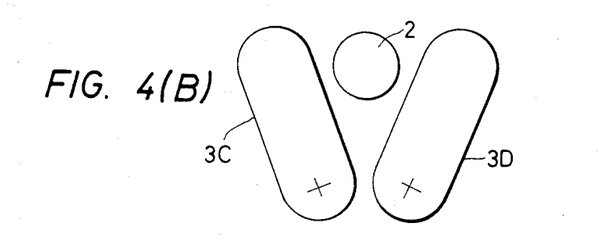
Figure 4C:
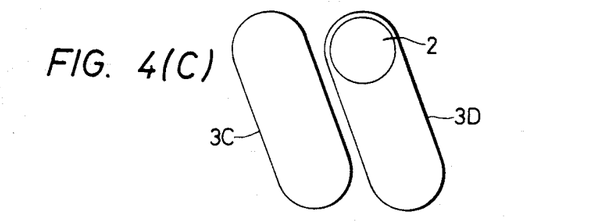
Figure 4D:
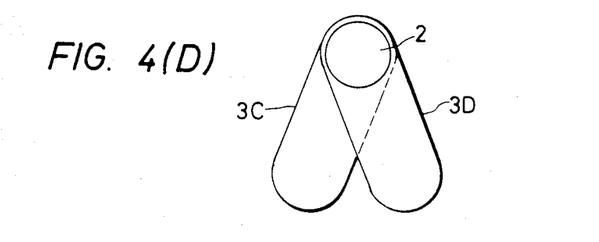

As shown in the top plan view of FIG. 3, the photographic shutter 3 comprises a normally closed shutter member 3C and a normally open shutter member 3D driven respectively by solenoids 3A, 3B. FIG. 3 shows the shutter elements with members 3C and 3D energized such that 3D covers the lens 2. This corresponds to the position in FIG. 4(C). While the solenoids 3A, 3B are being de-energized (dashed lines), the normally closed shutter member 3C is located in an optical path blocking lens 2 and the normally open shutter 3D is positioned out of the optical path, as shown in FIG. 4(A). It should be noted that FIGS. 4A-4D are views looking upward toward the shutter. When the solenoid 3A is energized by a shutter operating signal, the normally closed shutter member 3C is moved out of the optical path, as illustrated in FIG. 4(B), thereby starting an exposure. Upon elapse of a predetermined interval of time, the solenoid 3B is energized to move the normally open shutter member 3D into the optical path to finish the exposure, as shown in FIG. 4(C). Then, the solenoid 3A is de-energized to insert the normally closed shutter member 3C into the optical path, as illustrated in FIG. 4(D). Thereafter, the solenoid 3B is de-energized to retract the normally open shutter member 3D out of the optical path. The photographic shutter 3 is now returned to its original position.

Referring again to FIG. 1, the film cassette 5 has exposure windows in its both surfaces and can contain two sheet films. The cassette 5 includes retractable light shield plates placed over the film surfaces. Alternatively, the cassette 5 may have an exposure window in only one of the surfaces and contain a single sheet film.

The cassette holder 6 is composed of a vertical guide 6A, a cassette holder plate 6B movable along the vertical guide 6A, and a plurality of cassette presser springs 6C for pressing the inserted cassette 5 against the cassette holder plate 6B. A cassette insertion slot 6D and a cassette insertion slot cover 6E are located above the cassette holder 6.

The cassette moving mechanism 7 is of the same type of construction as the television monitor moving mechanism 8. It includes a crank mechanism composed of a first arm 7B attached to an output shaft 7C of a pulse or stepping induction motor (not shown), and a second arm 7C angularly movably mounted by a pin on the first arm 7B. As in the case of the moving mechanism 8, a position detector mechanism includes a cam (not shown) mounted on the shaft 7A of the stepping motor and a pair of limit switches (not shown) are held in engagement with the cam. The second arm 7C of the crank mechanism is angularly movably connected by a pin to an engagement member mounted on an end of the cassette holder plate 6B which holds the cassette 5. The cassette holder 6 is responsive to angular movement of the stepping motor to move reciprocably between top and bottom dead centers of the crank mechanism.

Figure 5:
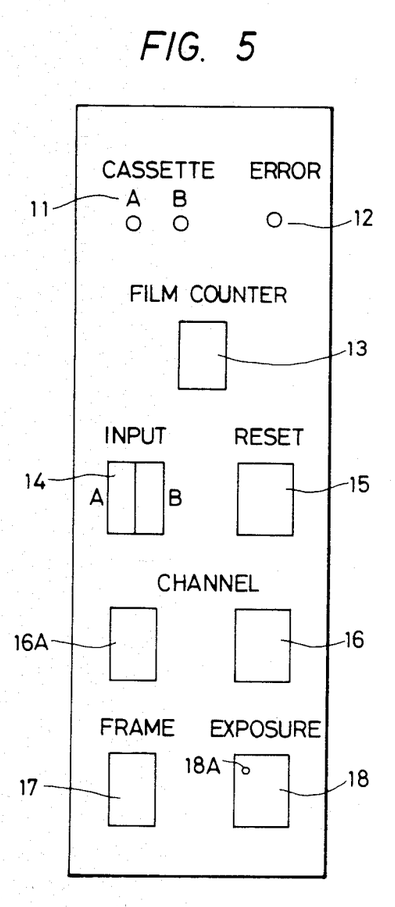
FIG. 5 is a plan view of a remote control unit associated with the apparatus shown in FIG. 1.

The separate-exposure photographic apparatus is normally remotely controlled while the operator is watching a monitor of a diagnostic system such as an X-ray CT diagnostic system or an ultrasonographic diagnostic system. FIG. 5 illustrates a remote control unit for use with the apparatus of the present invention. The remote control unit as shown can magnetically be attached to the body of the apparatus at any desired position. The remote control unit has an indicator 11 for indicating which surface of the cassette 5 is being exposed, an error indicator 12, a counter 13 for indicating the number of films exposed, a selector switch 14 for selecting one of two diagnostic systems A, B connectable to the apparatus of the invention, and a reset switch 15. The remote control unit also has a selector switch 16 for selecting one of a plurality of exposure condition channels which matches the imagery characteristics of the diagnostic system connected, a film to be exposed and other factors, a channel indicator 16A, an indicator 17 for indicating the identification number of a frame to be exposed on the film (the identification number ranges from 1 through 4 in the illustrated embodiment), and an exposure switch 18.

Figure 6:
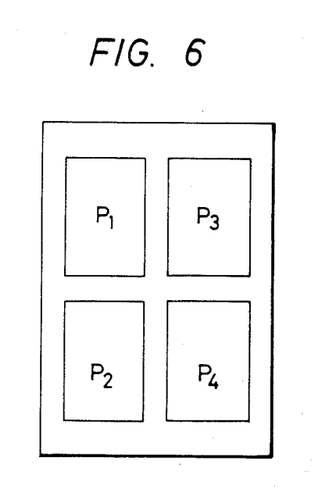
FIG. 6 is a plan view of a film showing frames to be exposed.

The operation of the apparatus according to the first embodiment will now be explained. In the illustrated embodiment, the four film frames will successively be exposed in order from P1 to P4 as illustrated in FIG. 6. The frames are arranged in a matrix of rows and columns. When the power supply of the apparatus is turned on, the apparatus is initialized such that the television monitor 1 and the cassette holder 6 are set in a position corresponding to the frame position P1. At the same time, the indicators on the remote control unit are set to initialized conditions.

The cassette 5 into which films have been loaded in a darkroom and the light shield plates have been set is inserted through the cassette insertion slot 6D into the cassette holder 6 with the cassette insertion slot cover 6E opened in the direction of the arrow. The cassette 5 is held against the cassette holder plate 6B under the resiliency of the presser spring 6C. The cassette 5 has a marking which is oriented in a predetermined direction during insertion, so that the indicator 11 on the remote control unit indicates the first film to be exposed. When the cassette 5 has been inserted in the proper position, the shield plate over the film surface to be exposed is pulled out and the cassette insertion cover 6E is closed.

Where only one diagnostic system is connected, it is selected by the selector switch 14, and where two diagnostic systems are connected, either one of them is selected by the selector switch 14. At the same time, one of the exposure condition channels is selected which matches the imagery characteristics of the selected diagnostic system and the characteristics of the film to be exposed, and the selected exposure condition channel is set by the selector switch 16 on the remote control unit.

The apparatus has now been readied for starting a photographing operation, and an image will be photographed by the apparatus as follows:

If the operator wants a particular image to be recorded while watching the monitor in the diagnostic system, he depresses the exposure switch 18 on the remote control unit. The image displayed on the television monitor 1 is photographed on the film at the position P1 by actuation of the shutter 3. The CRT of the television monitor 1 is not required to display images at all times, but may display the image only when it is to be photographed.

After the image has been photographed at the position P1 on the film, the cassette moving mechanism 7 is actuated to cause the cassette holder 6 to move the cassette 5 in one direction until the frame P2 on the film reaches the exposure position. The exposure switch 18 may now be depressed, the condition being indicated by the lighting of an indictor lamp 18A on the exposure switch 18.

After having confirmed that the indicator lamp 18A is turned on, the operator pushes the exposure switch 18 to photograph a second image. THe shutter 3 is actuated to photograph the image on the film at the frame position P2.

When the image has been recorded in the position P2, the television monitor moving mechanism 8 is driven to displace the television monitor 1, the lens and the shutter from their position corresponding to the frame positions P1, P2 on the film to a second position corresponding to the frame positions P3, P4. This movement of the television monitor 1 is controlled by the action of the crank mechanism operated by the stepping motor in the mechanism 8 and the position detection effected by the cam and limit switches. Simultaneously, the cassette moving mechanism 7 is actuated to enable the cassette holder 6 to move the cassette 5 in the opposite vertical direction until the frame position P3 arrives at the exposure position. When the movement of the cassette 5 has been completed, the indicator lamp 18A on the remote control unit is turned on. Thus, movement of the monitor moving mechanism 8 results in a lateral shifting relative to the cassette, i.e., from the P1-P2 position to the P3-P4 position. The cassette moving mechanism provides the necessary vertical movement of the cassette within one column of frames.

After the frame position P3 on the film has been exposed, the cassette moving mechanism 7 is actuated to displace the cassette 5 until the frame position P4 reaches the exposure position in the same manner as that when the frame position P1 has been exposed.

When the image has been photographed at the frame position P4, that is, all of the four frames on one of the films have been exposed, the cassette moving mechanism 7 and the television monitor moving mechanism 8 are actuated to bring the frame position P1 on the film into the exposure position, thereby initializing the cassette 5. The light shield plate which has previously been pulled out is inserted again over the first film, and the cassette 5 is removed. The cassette 5 is reversed and inserted again into the apparatus with the second film directed for exposure. The indicator 11 on the remote control unit indicates the second film to be exposed, and the frame number as indicatedby the frame indicator 17 returns to "1". The next photographing operation is now ready to start.

The sequence of the foregoing cycles of operation may be controlled by a combination of control logic circuits or a microcomputer under programmed control. While this embodiment shows a system for exposing four frames, it is understood that the matrix can be expanded and the number of sensors increased to allow for a greater number to be exposed. If the matrix is 3×3, sensors will be placed 120° apart.

A second embodiment of the present invention will now be described. An apparatus according to the second embodiment does not use the film cassette, but a supply magazine of films for exposure, the exposed films being stored in a separate receiver magazine.

Figure 7:
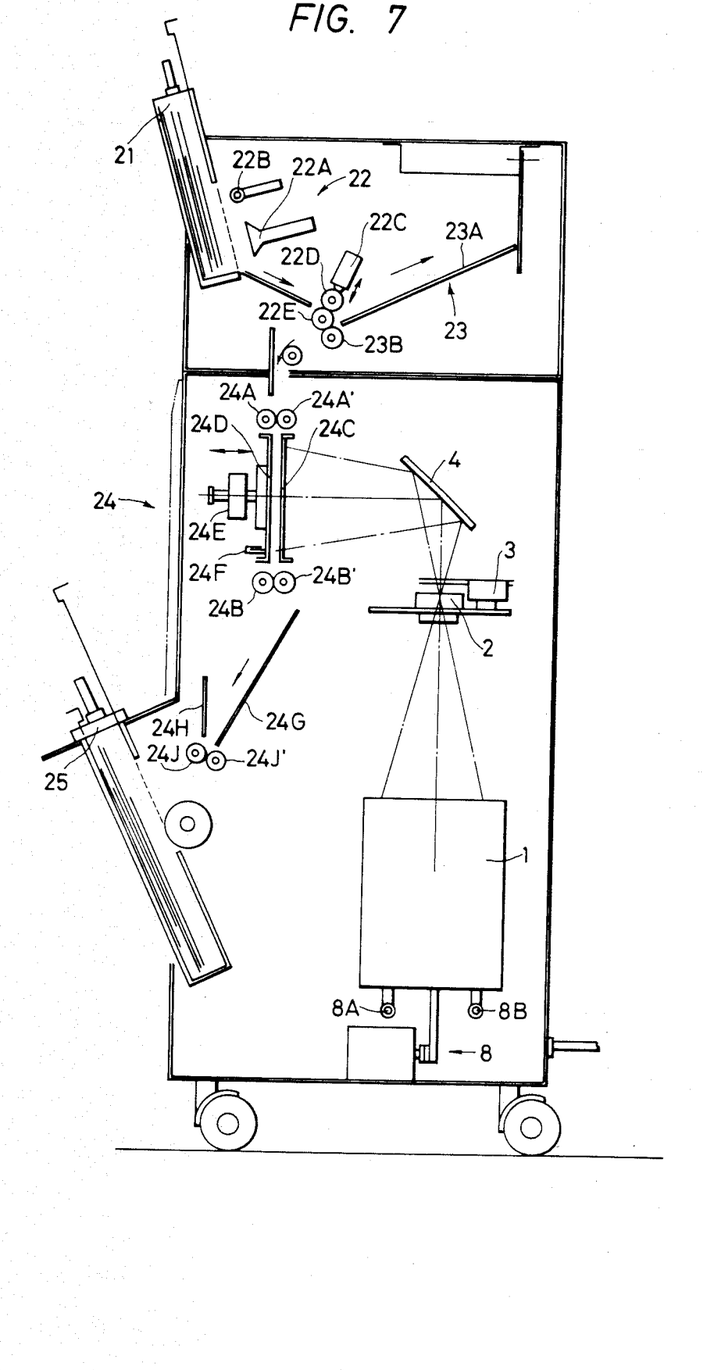
FIG. 7 is a schematic vertical cross-sectional view of an apparatus according to a second embodiment of the present invention.

As shown in FIG. 7, the apparatus comprises a film supply magazine 21, a film pickup mechanism 22, a temporary film storage section 23, a film exposure unit 24, and a film receiver magazine 25. Designated by the reference numerals 1 through 4 in FIG. 7 are the same components as those denoted by the identical reference numerals in FIG. 1.

The film supply magazine 21 is capable of storing about 100 films and has a film pickup opening in its one surface, which is provided with a retractable light shield plate. The film pickup opening is sized large enough to allow entry of film suction members 22A (described later) of the film pickup mechanism 22. The film supply magazine 21 is received by a magazine receiver (not shown) having means for detecting normal insertion of the film supply magazine 21 and means for detecting withdrawal of the light shield cover. These detecting means are composed of limit switches that are normally used and known in the art of film supplying devices.

The film pickup mechanism 21 comprises a plurality of film suction members 22A connected to a vacuum pump (not shown), a film presser roller 22B for preventing more than one film from being removed by the film suction members 22A, and a swing mechanism (not illustrated) for pressing the film suction members 22A against the film to pick up and feed the film to a next position. The film pickup mechanism 22 has an outlet in which there is disposed a detector 22C for detecting more than one film taken out at a time. The detector 22C is associated with one of a pair of feed rollers 22D, 22E so that the detector 22C can detect a displacement of the feed roller 22D indicative of increased thickness because of multiple films. The detector 22C may, however, be another arrangement known in the art.

The temporary film storage section 23 serves to store a film taken out by the film pickup mechanism 22 and fed by the feed rollers 22D, 22E, and is composed of a slanted film support plate 23A, the roller 22E and a feed roller 23B. The film support plate 23A is made up of a material hving a small coefficient of friction to allow the film to slip smoothly down the film support plate 23A.

The film exposure unit 24 is capable of receiving the film as fed from the temporary film storage section 23, and comprises two pairs of rollers 24A, 24A' and 24B, 24B' for feeding the film. Between the pairs of rollers, there are provided in a parallel fashion a photographic mask 24C and a film presser plate 24D. The photographic mask 24C is sized to cover the frames P1, P3 (or the frames P2, P4) on the film where the film as shown in FIG. 6 is to be exposed. In the case of another frame matrix, the mask would be appropriately sized. This arrangement allows the photographic mask 24C to remain at rest when the television monitor 1 is moved, and also permits the flatness of the film to be fully maintained. The film presser plate 24D is connected to a plate driver solenoid 24E mounted on a body of the apparatus. When the plate driver solenoid 24E is energized, the film presser plate 24E is displaced toward the photographic mask 24C to hold the film against the latter for a desired degree of flatness of the film. De-energization of the solenoid 24E allows the film presser plate 24D to return under the resiliency of a spring (not shown) to a position sufficiently removed from the photographic mask 24C to permit the film to be fed unobstructedly along between the plate 24D and the mask 24C.

The film exposure unit 24 also has a film reference position sensor 24F for detecting the leading end of the film as fed from above in FIG. 7 in order to stop the travel of the film. The film reference position sensor 24F also serves as a reference to allow the film to be fed a predetermined interval to a next exposure position after one frame has been exposed.

Downward from the film exposure unit 24, there are disposed guides 24G, 24H and feed rollers 24J, 24J' for transporting the film discharged from the film exposure unit 24 into the film receiver magazine 25.

The film receiver magazine 25 serves to store about 10 exposed films. The film receiver magazine 25 has openings in its opposite surfaces which are provided with retractable light shield covers. The films which have been placed into the magazine 25 through one of the openings can be taken out for development through the other opening. Thus, the films stored in the film receiver magazine 25 can be processed on a "first come, first served" basis.

Figure 8:
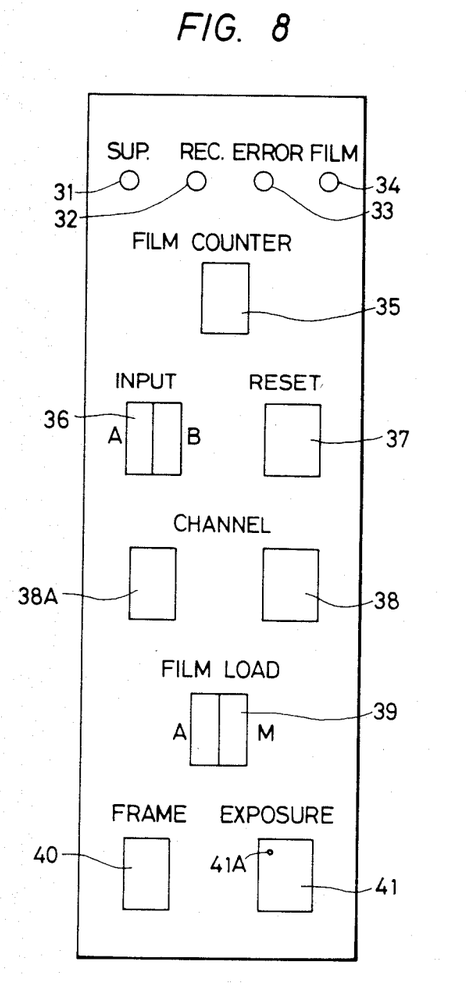
FIG. 8 is a plan view of a remote control unit associated with the apparatus illustrated in FIG. 7.

FIG. 8 is illustrative of a remote control unit for the apparatus shown in FIG. 7. The remote control unit has an indicator lamp 31 which will be turned on when the film supply magazine 21 is set in position when the light shield cover is retracted to allow film pick up, an indicator lamp 32 which will be turned on when the film receiver magazine 25 is set in position with the light shield cover on the film receiving side being pulled out to allow film storage, an error indicator lamp 33, and an indicator lamp 34 for indicating that a film to be exposed in a next photographing operation is set in the temporary film storage section 23. The remote control unit also has a counter 35 for indicating the number of films exposed, a selector switch 36 for selecting one of two diagnostic systems A, B connectable to the apparatus, a reset switch 37, a selector switch 38 for selecting one of a plurality of exposure condition channels which matches the imagery characteristics of the diagnostic system connected, a film to be exposed and other factors, a channel indicator 38A, a selector switch 39 for feeding successive films automatically or manually, an indicator 40 for indicating the identification number of a frame to be exposed on the film, and an exposure switch 41.

Operation of the apparatus of the second preferred embodiment is as follows. In the following description, four frames P1 through P4 as shown in FIG. 6 will be exposed on a single film as with the previous embodiment. It will be understood that another suitable matrix of frames may also be employed as in the case of the first embodiment.

The film supply magazine 21, which has been loaded with films in a darkroom and closed by the light shield cover, is placed in the magazine receiver, and then the light shield cover is pulled out. The film receiver magazine 25 is also set in place with its film receiving opening being held open.

The power supply of the apparatus is then turned on to initialize the apparatus by positioning the television monitor 1 in a location corresponding to the frame position P1 on the film, holding movable parts such as the film suction members 22A in their standby positions, and actuating the vacuum pump connected to the film suction members 22A. The indicators on the remote control unit are also reset.

The selector switch 36 on the remote control unit is actuated to select a diagnostic system connected, and at the same time the channel selector switch 38 is operated to select one of the preset exposure condition channels which matches the imagery characteristics of the selected diagnostic system, the characteristics of the film to be exposed, and other factors.

The apparatus has now been readied for starting a film exposure operation. The film will be exposed in the following manner directed to automatic film feeding.

Prior to the film exposure operation, the operator pushes the exposure switch 41 on the remote control unit. Such action is needed only when the apparatus is to be started. The film pickup mechanism 22 is actuated to take a film out of the film supply magazine 21. The film is then fed through the temporary film storage section 23 into the film exposure unit 24 until the film reaches the reference position as defined by the sensor 24F. In the automatic film feeding mode, a second film automatically starts being removed from the film supply magazine 21 when the first film in the film exposure unit 24 is exposed, e.g., when an image is photographed on the frame P1, and the second film thus picked up is stored in the temporary film storage section 23. Accordingly, the time required for films to be changed can be reduced in successive photographing operations.

After the film has thus been set in the exposure position, the operator records a desired image while watching the monitor of the diagnostic system by depressing the exposure switch 41 on the remote control unit. The image which is displayed on the CRT of the television monitor 1 is then photographed on the frame P1 in response to actuation of the shutter 3.

After the frame P1 on the film has been exposed, a pulse or stepping induction motor (not shown) for driving the feed rollers 24A, 24A', 24B, 24B' in the film exposure unit 24 is energized to feed the film a predetermined interval until the frame P2 reaches the exposure position. The arrival of the frame P2 at the exposure position is indicated by an indicator lamp 41A on the exposure switch 41.

The operator then confirms the lighting of the indicator lamp 41A and pushes the exposure switch 41 to cause an image to be photographed on the frame P2. After the image has been photographed on the frame P2, the television monitor 1 is moved to a position corresponding to the frame P3 on the film in the same manner as that in the preceding embodiment. Simultaneously, the stepping motor in the film exposure unit 24 is energized to move the film back to the original position in which the frame P3 is now in the exposure position.

When the frame P3 has been exposed, the film is fed along to displace the frame P4 to the exposure position in the same manner as that after the image has been photographed on the frame P1.

Upon completion of the exposure of the frame P4, the film is transported as it is guided by the guides 24G, 24H into the film receiver magazine 25, and the television monitor 1 is returned to the position corresponding to the frame P1 position. Concurrent with or a suitable period after the discharge of the exposed film from the film exposure unit 24, the next film stored in the temporary film storage section 23 is transported to the predetermined position in the film exposure unit 24. The frame number as indicated on the frame indicator 40 on the remote control unit returns to "1" in response to the foregoing film exchange. The apparatus is now readied for a next cycle of photographing operations.

While in the foregoing embodiment film is fed along automatically, it may be fed along manually where the number of films to be exposed is small. In the manual film feeding mode, the film is set in place in response to the first actuation by the operator of the exposure switch 41, and no film is temporarily stored in the temporary film storage section 23.

Errors indicated by the error indicator 33 may include a failure of film pickup by the film pickup mechanism 22, a failure of smooth delivery of the film from the temporary film storage section 23 to the film exposure unit 24, a failure of smooth transportation of the film from the film exposure unit 24 to the film receiver magazine 25, a failure of smooth movement of the television monitor 1. The error indicator 33, however, may be arranged to indicate other errors.

The apparatus according to the second embodiment may be controlled by a combination of logic circuits or a microcomputer under programmed control. The film counter 35 on the remote control unit may be indicative of the number of films stored in the film supply magazine as the number is successively reduced each time the films are fully exposed.

While in the foregoing embodiment a single film is exposed on four frames thereof, the number of frames on a single frame is not limited to four, but may freely be selected otherwise. With such a modification, the television monitor moving mechanism 8, and the cassette moving mechanism 7 or the film feeding mechanism in the film exposure unit 24 may be arranged to move the television monitor and the cassette or the film for corresponding intervals.

The apparatus has input terminals for connection to two diagnostic systems. Such input terminals may be utilized to receive video and synchronizing signals separately so that the quality of images displayed on the CRT of the television monitor 1 can be improved.

Conditions that can be set by the exposure condition channels may include the difference between negative and positive images, contrast, brightness, and exposure time, for example. Some of the indicators on the remote control unit may comprise a combination of an indicator lamp and an alarm device, such as a buzzer. Where a plurality of different conditions are required to be indicated such as on the error indicator, varying alarms can distinguish one such condition from the others.

Figure 9:
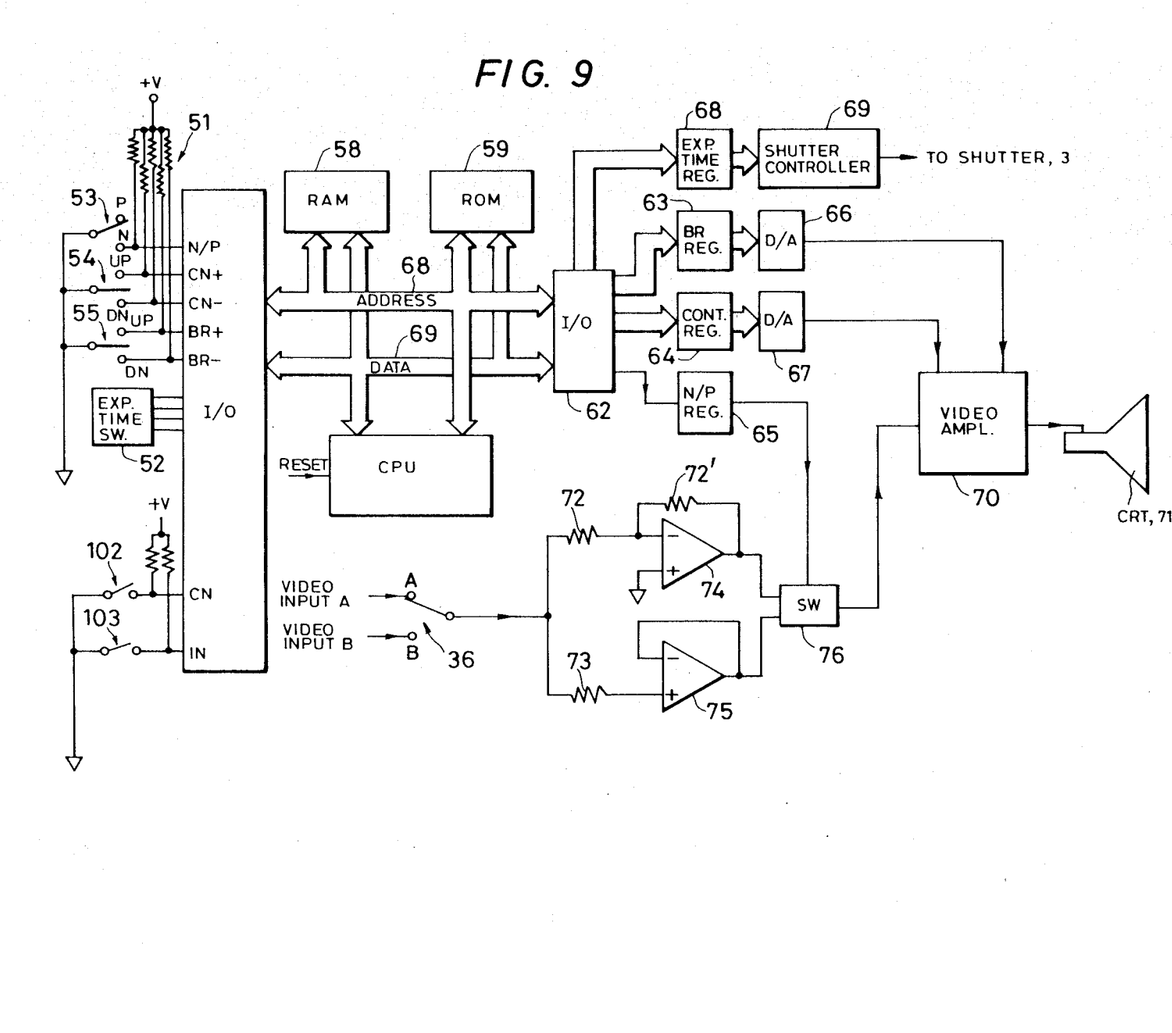
FIG. 9 is a schematic block diagram of control unit used in a third embodiment of the invention.

FIG. 9 is a schematic block diagram of a control unit used in a separate-exposure photographic apparatus according to a third embodiment of the present invention. In this embodiment, the operator is able to control the brightness, contrast, and image polarity of the image displayed on the CRT of the monitor 1 and which is to be photographed.

An exposure time setting switch 52, which may be a thumbwheel switch or the like, is provided for setting an exposure time permitted by the shutter 3. Further, three switches 53, 54 and 55 are provided for setting the image polarity, contrast and brightness, respectively. The switch 33 has two stable positions P (positive image polarity) and N (negative image polarity). On the other hand, the switches 54 and 55 are spring-loaded switches having a stable center position where the center, movable contact is not in contact with either fixed contact, and spring-biased, fixed contact positions UP and DN on either side of the center position where the center contact is spring-biased to return to the center position. The two fixed-contact positions of the switches 54 and 55 are labeled UP and DN to indicate that the contrast and brightness are raised when the respective switch is set to the UP position and lowered when it is set to the DN position. The N contact of the switch 53 and the UP and DN contacts of the switches 54 and 55 are connected to a positive voltage source +V through current-limiting resistors 51. The signal on the N contact of the switch 53, indicated by N/P is in the logic "0" state (ground level) when the switch 53 is set to the N position and in the logic "1" state (+V) when the switch 53 is set to the P position. The sigal CN+ or CN−, from the UP and DN contacts, respectively, of the switch 54, to to the "0" state when the movable contact is urged in the respective UP or DN direction, and otherwise are in the "1" state. The same is the case for the signals BR+ and BR− from the UP and DN contacts of the switch 55. Reference numerals 102 and 103 denote a remote channel switch and a remote input switch.

Figure 9A:
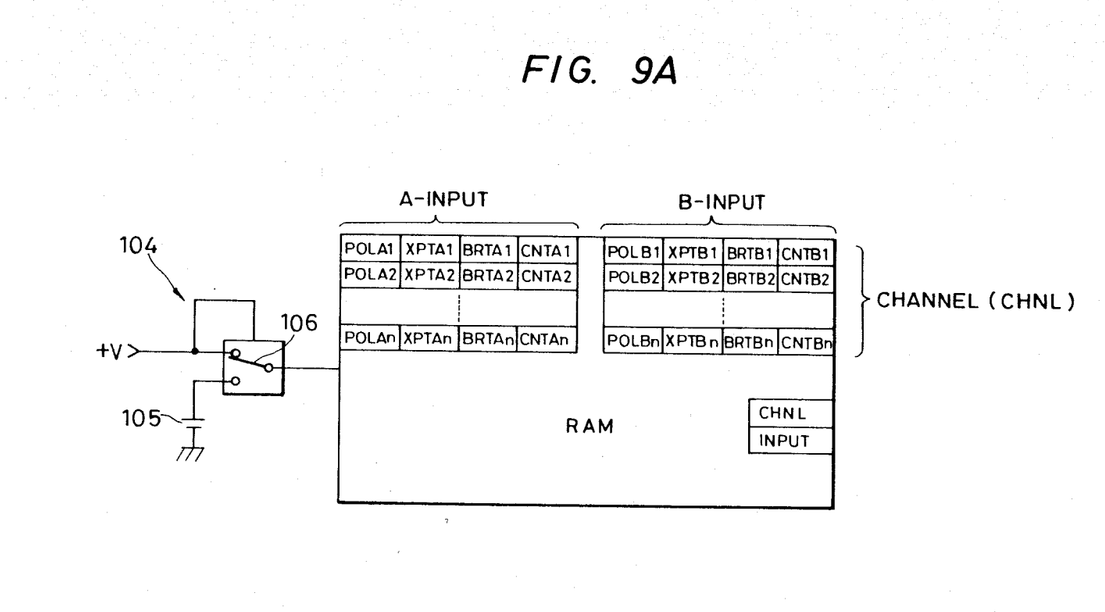
FIG. 9A shows an RAM of FIG. 9 in more detail.

All of the signals N/P, CN+, CN−, BR+ and BR− and the output of the exposure time switch 52 are applied to respective inputs of an I/O unit 57. These signals are retrievable by a CPU 61 via an ADDRESS bus 68 and a DATA bus 69. Also connected to the ADDRESS bus 68 and the DATA bus 69 are a RAM 58 (best shown in FIG. 9A), a ROM 59, and another I/C unit 62. As best shown in FIG. 9A, the RAM 58 is connected to an electric source backup circuit 104 including a switch 106 and an RAM backup battery 108. The RAM stores data values POL A(n), BRT A(n), and CNT (n) (n is the integer representing a channel n) of a video input A which correspond, respectively, to predetermined levels of image polarity, exposure time, brightness, and contrast. Also, the RAM stores data values of POL B(n), XPT B(n), BRT B(n), and CNT B(n) for a video input B.

To the output side of the I/O unit 62 are coupled an exposure time register 68, a brightness level register 63, a contrast level register 64, and a single-bit (flip-flop) image polarity register 65, which respectively hold values which control the exposure time permitted by the shutter 3 and the brightness, contrast and image polarity of the image displayed on the CRT 71 of the monitor 1. For this purpose, the output of the exposure time register 68 is applied to a shutter controller 69 for the shutter 3, and the outputs of the registers 63 and 64 are applied through respective digital-to-analog converters 66 and 67 to the brightness and contrast control inputs of a video amplifier 70, the latter driving the CRT 71.

The output of the switch 36 (referred to above) is applied to the inverting and noninverting inputs of operational amplifiers 74 and 75 through resistors 72 and 73, respectively. The output of the operational amplifier 74 is fed back through a resistor 72' to the noninverting input of the amplifier 74. The outputs of both the amplifiers 73 and 74 are applied to inputs of an electronic switch 76 which is controlled by the output of the image polarity register 65. The output of the switch 65 is applied to the video signal input of the video amplifier 70.

The operation of the control unit shown in FIG. 9 will be explained with reference to the flowchart of FIG. 10.

After the CPU 61 is initialized by a RESET signal. The values BRT and CNT along with whatever values are stored for XPT and POL are next transferred via the I/O unit 62 to the registers 68, 63, 64 and 65, respectively. After digital-to-analog conversion, the values BRT and CNT then control the brightness and contrast of the displayed image, while the value XPT sets the exposure time and POL selects either the output of the amplifier 74 (negative polarity image) or the output of the amplifier 75 (positive polarity image) for driving the CRT 71. After timing out for a predetermined period of time, a test is performed to determine whether or not the signal BR+ is 0, indicating that the operator has pushed the brightness control switch 55 to the UP side to increase the brightness setting. If yes, BRT is incremented by one. The current values of BRT, CNT and POL are then transferred to the corresponding registers. This process continues until the displayed brightness has reached the desired level, whereupon the switch 55 is released. A similar process is carried out when the brightness is to be reduced, that is, when BR−=0, in which case BRT is decremented rather than incremented.

When no brightness level change is being indicated, a test is made as to whether the CN+ signal is 0, indicating that the operator has pushed the contrast control switch 54 to increase the contrast setting. If yes, CNT is incremented by one. This process is repeated until the desired contrast level is reached, whereupon the switch 55 is released. A similar process is carried out when the contrast is to be reduced, that is, when CN−=0, in which case CNT is decremented rather than incremented.

Figure 10:
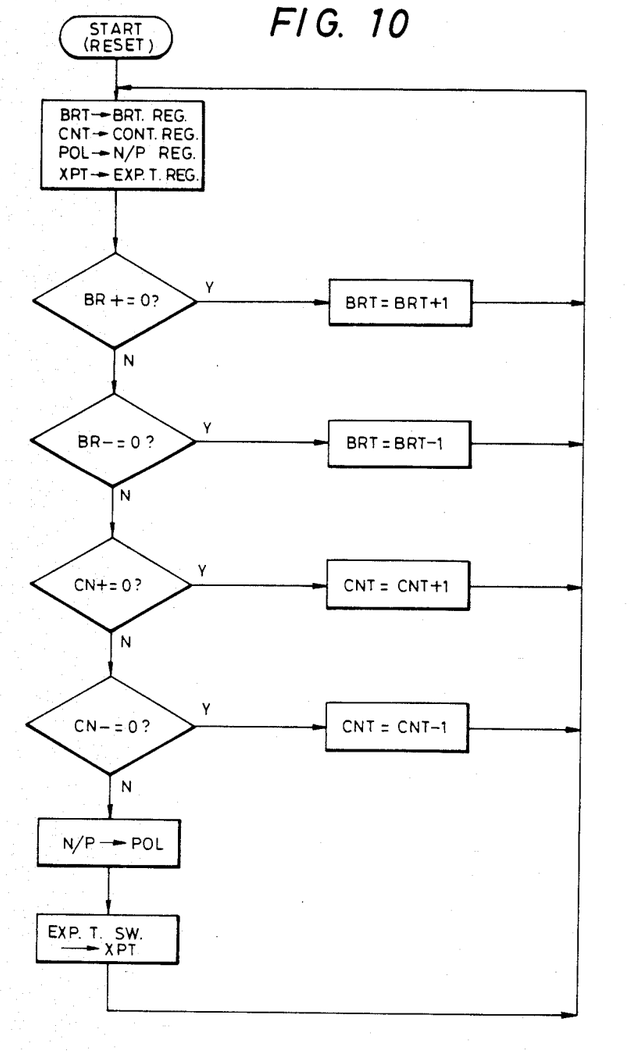
FIG. 10 is a flowchart showing operations of a central processing unit used in the control unit of FIG. 9.

Since the procedure shown in the flowchart of FIG. 10 is ordinarily only a portion of the overall operations performed by the CPU 61 and is executed as a subroutine thereof, the same effect can be achieved by merely executing the subroutine at appropriately spaced intervals.

If no brightness or contrast changes are indicated, then the value POL stored in the RAM 58 is set in accordance with the setting of the switch 53, that is, in accordance with the state of the signal N/P, and the value set on the switch 52 is inputted for XPT.

With the arrangement of the present invention, as described above, a separate-exposure photographing apparatus includes an image display unit for displaying an image to be photographed, a projection optical system for projecting and focusing the image displayed on the image display unit onto a film, and a film feeder mechanism for feeding the film, the projection optical system having a reflecting mirror therein, the image display unit being horizontally movable, and the film feeder mechanism being capable of feeding the film in the vertical direction. The apparatus is highly advantageous in that the flatness of the film cannot be impaired, images which have been photographed are of improved quality, and the apparatus takes up a reduced area of installation. With film magazines used, a second film can be readied while a first film is being exposed, so that the time it takes for the films to be exchanged will be reduced in successive film exposure operations.

Figure 10A:
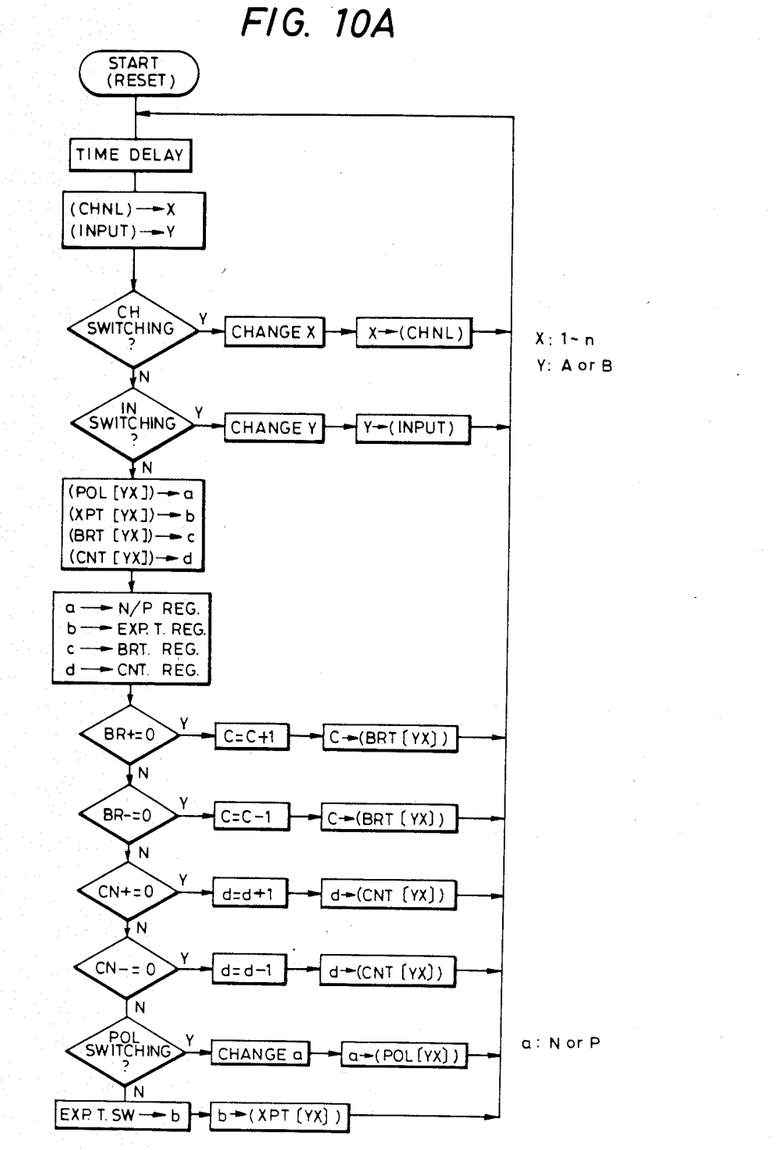
FIG. 10A is a flowchart which is similar to FIG. 10 but shows the operation using a plurality of channels and two video output.

FIG. 10A shows a flowchart for illustrating a plurality of channels 1 to n and two video inputs A and B in accordance of the present invention.

What is claimed is:

1. A separate-exposure photographing system comprising:
   image display means for displaying an image to be photographed;
   an optical system for projecting and focusing an image displayed on said image display means on to a film, a photographic lens positioned to received said displayed image, a shutter mechanism to transmit the image focused by said photographic lens and, a single reflecting mirror to project the focused image onto said film, said shutter mechanism comprising a pair of shutter members, a first of said shutter members being normally positioned in an optical path between said lens and said reflecting mirror to block transmission of said focused image and a second of said shutter members being normally positioned outside said optical path and movable a predetermined time following actuation of said first shutter member to block said optical path;
   means for horizontally shifting the position of said image display unit and said optical system;
   a film feeder for vertically feeding film to be exposed by said optical system, said film feeder comprising a film source magazine for storing a plurality of film units, a temporary film storage member, and means for removing film from said film source magazine and transferring the film removed from said magazine to said temporary storage member, a film exposure section for receiving said image from said optical system, means for supplying a film unit from said magazine to said exposure section, a film unit receiver magazine for storing exposed film units, and means for transferring an exposed film unit from said exposure section to said receiver section; and
   means for inputting a plurality of photographing conditions for controlling said display means, said photographing conditions including a negative/positive conversion condition, a contrast condition, and a brightness condition.

2. The separate-exposure photographing system of claim 1, further comprising means for storing said photographing conditions and means for selecting one of said conditions.

3. The separate-exposure photographing system of claim 1, further comprising a film supply magazine, a temporary storage unit for temporarily storing therein film taken from said film supply magazine, and means for transferring said film from said storage unit to a photographing position.

4. The separate-exposure photographing unit of claim 1, wherein said optical system for projecting and focusing said image comprises a lens, a shutter, and a reflex mirror, and further comprising means for mounting said optical system so as to be movable together with said display means vertically parallel to a surface of a film at a photographing position thereof.

5. A separate-exposure photographing system comprising:
   image display means for displaying an image to be photographed;
   an optical system for projecting and focusing an image displayed on said image display means on to a film, a photographic lens positioned to receive said displayed image, a shutter mechanism to transmit the image focused by said photographic lens and, a single reflecting mirror to project the focused image onto said film, said shutter mechanism comprising a pair of shutter members, a first of said shutter members being normally positioned in an optical path between said lens and said reflecting mirror to block transmission of said focused image and a second of said shutter members being normally positioned outside said optical path and movable a predetermined time following actuation of said first shutter member to block said optical path;
   means for horizontally shifting the position of said image display unit and said optical system;
   a film feeder for vertically feeding film to be exposed by said optical system, said film feeder comprising a film source magazine for storing a plurality of film units, a temporary film storage member, and means for removing film from said film source magazine and transferring the film removed from said magazine to said temporary storage member, a film exposure section for receiving said image from said optical system, means for supplying a film unit from said magazine to said exposure section, a film unit receiver magazine for storing exposed film units, and means for transferring an exposed film unit from said exposure section to said receiver section; and means for inputting a plurality of photographing conditions for controlling at least on of said display means, said photographing conditions including a negative/positive conversion condition, a contrast condition, and a brightness condition.

6. The separate-exposure photographing system of claim 5, further comprising shutter means disposed in an optical path between said display means and a film to be exposed, and wherein said photographing conditions further include an exposure time condition.

7. The separate-exposure photographing system of claim 6 or 5, further comprising means for storing said photographing conditions and means for selecting one of said plurality of conditions.

8. The system of claim of claim 7, further comprising means for digitally controlling an image displayed on said image display means in accordance with the selected one of said conditions.

9. The separate-image photographing system of claim 5, wherein said means for horizontally shifting the position of said image display unit and said optical system comprises a rail, guide means for moving said display unit horizontally on said rail, a motor having an output shaft, linkage means for converting rotation of said output shaft into reciprocating motion of said guide means, and limit means for sensing rotary positions of said output shaft and discontinuing rotation of said motor at a predetermined rotary position thereof, whereby said image display unit and said optical system can be shifted between at least two predetermined positions.

10. The separate-image photographing system of claim 9, wherein said limit means comprises a cam mounted on said output shaft and a plurality of sensors positioned relative to said cam in predetermined angular locations corresponding to said predetermined positions of said image display unit and said optical system.

11. The separate-image photographing system of claim 5, wherein said vertical film feeder comprises a vertically oriented cassette holding a film and means for vertically moving said cassette relative to said optical system.

12. The separate-image photographing system of claim 11, wherein said cassette comprises an internal holding plate and a spring plate respectively confronting opposite sides of said film, an insertion slot for said film being formed in said cassette.

13. The separate-image photographing system of claim 5, wherein said means for supplying a film unit comprises a first pair of feed rollers positioned on top of said exposure section and a second pair of rollers disposed on the bottom of said exposure section, said first and second sets of rollers being actuated to selectively position said film unit in said exposure section.

14. The separate-image photographing system of claim 5, wherein said exposure section comprises a photographic mask and a pressure plate confronting opposite sides of said film unit, means for urging said pressure plate against said film unit, and sensor means for determining the position of said film in said exposure section.

15. A separate-exposure photographing system comprising:

image display means for displaying an image to be photographed;

an optical system having a single mirror and a lens for projecting and focusing an image displayed on said image display means onto a film;

means for horizontally shifting the position of said image display means and said optical system;

a vertically oriented cassette holding a film;

means for vertically moving said cassette relative to said optical system; and means for inputting a plurality of photographing conditions for controlling at least one of said display means, said photographing conditions including a negative/positive conversion condition, a contrast condition, and a brightness condition.

16. The separate-exposure photographing system of claim 15, further comprising shutter means disposed in an optical path between said display means and a film to be exposed, and wherein said photographing conditions further include an exposure time condition.

17. The separate-exposure photographing system of claim 16, further comprising means for storing said photographing conditions and means for selecting one of said plurality of conditions.

18. The separate-exposure photographing system of claim 15, further comprising means for storing said photographing conditions and means for selecting one of said plurality of conditions.

19. The system of claim 15, further comprising means for digitally controlling in image displayed on said image display means in accordance with the selected one of said conditions.

* * * * *